United States Patent [19]

Weman et al.

[11] Patent Number: 4,457,251

[45] Date of Patent: Jul. 3, 1984

[54] BELT LOAD INDICATOR

[75] Inventors: Per O. Weman, Heverlee, Belgium; Fred F. Neumann, Rochester, Mich.

[73] Assignee: N. V. Klippan S.A., Haasrode, Belgium

[21] Appl. No.: 16,861

[22] Filed: Mar. 2, 1979

[30] Foreign Application Priority Data

Mar. 15, 1978 [DE] Fed. Rep. of Germany ....... 2811199

[51] Int. Cl.³ .............................................. A44B 21/00
[52] U.S. Cl. .................................... 116/212; 116/203; 116/DIG. 34; 297/46 P; 297/472
[58] Field of Search ....... 116/212, 200, 203, DIG. 34, 116/28 R; 73/143; 297/468, 472; 280/801, 805, 806

[56] References Cited

U.S. PATENT DOCUMENTS

| 3,428,362 | 2/1969 | Bertelson | 116/200 |
| 3,438,674 | 4/1969 | Radke | 280/805 |
| 3,692,361 | 9/1972 | Ivarsson | 297/468 |
| 3,885,428 | 5/1975 | Dalferth | 73/143 |
| 3,908,452 | 9/1975 | Rieger | 73/143 |
| 4,111,459 | 9/1978 | Magyar | 280/801 |
| 4,129,321 | 12/1978 | Garvey | 280/801 |

FOREIGN PATENT DOCUMENTS

| 2508728 | 9/1976 | Fed. Rep. of Germany ...... 297/468 |
| 1433618 | 4/1976 | United Kingdom . |

Primary Examiner—Charles Frankfort
Assistant Examiner—Denis E. Corr
Attorney, Agent, or Firm—Roger H. Criss

[57] ABSTRACT

Apparatus to indicate the load on a restraining device subject to tensile loading, especially for a safety belt, the restraining device having an opening for communication with a restraining element, such as a seat belt, and being formed of two parts having different tensile strengths. The parts are displaceable with respect to each other upon loading of the restraining device in tension above a predetermined amount and one of the parts is provided with an indicator sign which becomes visible upon such displacement.

9 Claims, 4 Drawing Figures

BELT LOAD INDICATOR

BACKGROUND OF THE INVENTION

This invention relates to means to indicate the load on a restraining device subject to tensile loading, especially for a safety belt in a motor vehicle, where the restraining device has an opening for affixing a restraining element.

For years it was desired by the motor vehicle and transportation industries and in insurance, to have a device, e.g. in the safety belt system of a motor vehicle, which would unequivocally indicate whether or not a restraint system was once subjected to a load, which is encountered particularly during an accident. In the past such a loading could only be established or more or less presumed, when the belt was abraded or chafed, or if the metal parts used, e.g. as slides or supports for the belt, were subjected to tensile stresses and were bent or broken. However, many car accidents are not so severe as to bend the restraining device for the safety belt, especially since they are made of thick plates and are very durable. Thus, by examination of a built-in safety belt system, it was not always unequivocally possible to establish if the belt system in question was subjected to an accident or to a tensile stress surpassing a certain threshold value.

Therefore, the objective of this invention is to provide a device of the kind described which would suitably indicate in a simple and dependable manner if a belt fitting or other restraining apparatus subject to tensile stress surpassed a certain load threshold.

In accordance with this invention, there is provided an indicating means for indicating when a restraining device is subject to a tensile loading above a predetermined amount, said restraining device having an opening for communication with a restraining element, said restraining device comprising at least two parts having different tensile strengths, said parts being displaceable with respect to each other upon loading of said restraining device in tension above said amount, one of said parts having indicator means which becomes apparent upon displacement of said parts.

According to the invention, the above problem is solved in such a manner that the restraining apparatus is built of two parts of different tensile strength, which are displaced with respect to each other by a tensile stress, and one part has an indicator symbol, which becomes visible through the displacement. The two parts of the restraining apparatus are connected on one side so that they cannot slide on each other, while on the side opposite from the connection a displacement is possible, and especially when subjected to impact-like tensile loading, the part with the lower tensile strength can be displaced with respect to the other one. This movement takes place either by stretching of an elastic part and appearance of a sign activated by such stretching, or in another embodiment by breaking of the part with the lower tensile strength, whereby a sign also becomes visible.

In the preferred embodiment of this invention, one part of the restraining apparatus is an at least partially colored and/or linscribed metal plate with an opening for affixing the restraining element, and the other part is a plastic cap at least partially surrounding the surface of the first part. There are then two parts of different tensile strength, where the plastic cap has obviously a lower tensile strength than the metal plate. The plastic cap is positioned on part of the metal plate, or on the whole metal piece, as an at least one-sided jacket. If such a supporting device is subjected to a tensile stress, the plastic cap can break and it can expose a sign, even though the metal plate is not bent or otherwise deformed at all, as would occur with safety belts involved in minor accidents. If the plastic cap falls off the metal, or exposes part of the metal, it is desirable for the metal to have an indicating color or to be inscribed in addition, so that the observer will immediately recognize that the restraining device was subjected to a tensile stress.

Preferably the device of this invention will indicate the stressing of the restraining device in an irreversible manner. This is desirable, since for safety reasons a belt system subjected to an accident, even a minor accident, should be replaced.

According to this invention it is also preferred that the plastic cap should exhibit an opening, which is arranged in a displaced manner with respect of the opening on the metal plate, with a partial overlap. Many fittings or supporting devices of safety belts exhibit an opening, often a long slot, through which the safety belt is pulled. According to this invention, the plastic cap overlaps the metal plate in such a manner that although a similar long slot or a similarly shaped opening is also present on the plastic cap, it is not directly above the corresponding opening in the metal plate, but it is offset therefrom. By such construction, the belt, e.g. in normal use of the safety belt without any special load, is supported by the plastic cap and not by the metal plate. If an accident occurs, or a tensile load develops for some other reason, so that the plastic cap cannot support the forces any longer, it will tear or break, and then the metal plate takes over, i.e. the belt, which goes through the opening of the metal plate also, is now positioned against one side of the opening in the metal plate, and is supported by such plate. Thereby safety is satisfactorily assured, but through the breaking of a part, namely the plastic cap, exposure of a surface of the metal plate equipped with an indicator color and/or inscription, is accomplished.

In another preferred embodiment of the invention, both parts of the restraining device have another hole for a fastening screw, and they can be rotated around the screw. After breaking of the plastic cap, one part may remain on the fastening screw, and it can freely rotate around this under the effect of gravity, while the other part, which is surrounded by the belt strap, is pulled up. The space exposed in between shows the indicator color and/or the inscription, so that the irreversible indication of the loading of the fixture is suitably and with certainty accomplished.

In another embodiment of the invention, the plastic cap has at least one notch or weakening indentation between the hole for the fastening screw and the opening for the restraining element. The above-mentioned advantage of exposing a certain colored or inscribed surface on the metal plate or similar object through free rotation of a piece of the plastic cap around the fastening screw, is promoted, and it will take place in a better-defined manner, for example in such a manner that the inscription can be easily read, if the break lines are directed through the above indentations in definite directions. For example, in case of a symmetrically built fixture these notches can be arranged on both sides in the same line, which can be drawn through the opening for the restraining element on one hand, and the hole for the fastening screw on the other hand. This notch will then initiate the break line at a desired place, e.g. from the outside edge in the range between the screw hole and the slot, to the slot for the restraining element; and preferably such notches can also be provided on both sides of the axis of symmetry in the area of the slot for the restraining element, in order to guide the break line of the plastic cap in an exactly defined manner, and to better adjust the load limit. The longer the notches are, the smaller is the required load, i.e. the easier the plastic cap breaks along the desired line, and the indicator is revealed.

It is especially advantageous that the restraining element is a safety belt, and the restraining device is a buckle tongue or a fitting for an anchoring point. On the other hand, such a restraining device can also be used on the belt buckle itself, on the buckle fastening plate, on the swivel arm, etc., with the only requirement being that the restraining device must be subjected to a tensile stress, so that displacement of the plastic part (or part made of other rigid material) against the metal plate will result under tension.

Further advantages, characteristics and application possibilities of the present invention follow from the following description relating to the drawings. In the drawings.

Figure 1:
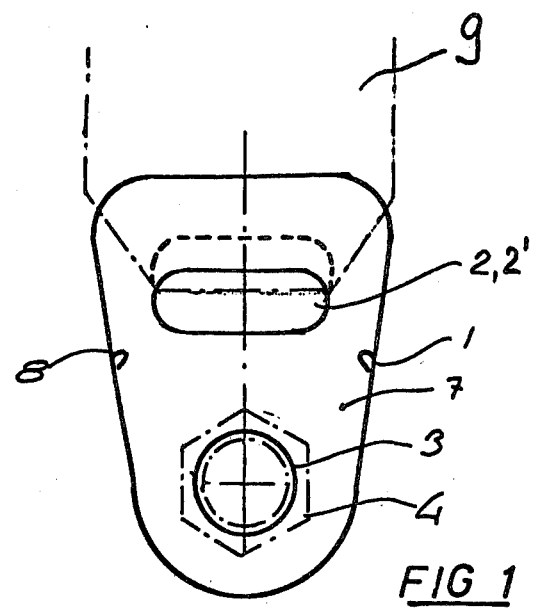
FIG. 1 is a top view of a restraining device useful as a fixture, as described in this invention, in the unloaded state.
Figure 2:
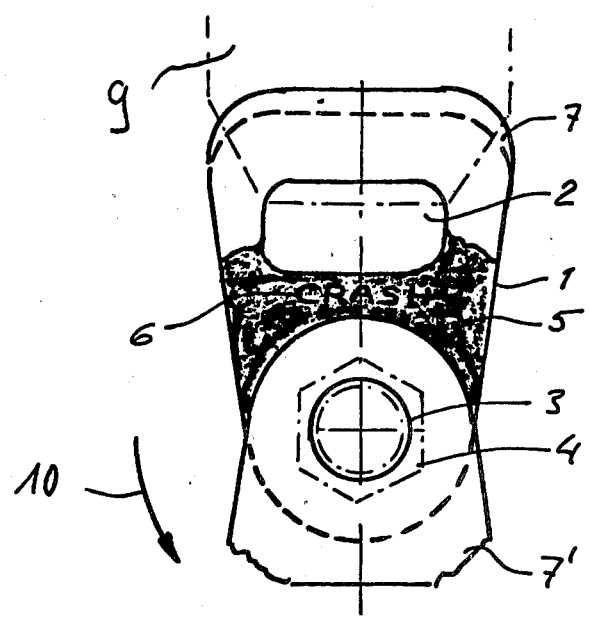
FIG. 2 is the same view as in FIG. 1, but the restraining device being shown after application of the tensile stress and exposure of the indicator.

FIGS. 1 and 2 show an anchoring point fitting for a safety belt 9. The fitting constitutes the restraining device and it consists of a stamped and perhaps also bent metal plate 1, which has an opening 2 for affixing the safety belt. The surface of the metal plate 1 is surrounded by a plastic cap 7, which is also equipped with a corresponding opening 2' for insertion of the safety belt 9.

At a distance from the opening for affixing the safety belt 9 as a restraining element, another hole 3 is provided, through which a bolt 4 is inserted for fastening the fitting to a location (not shown) in a motor vehicle. Through the center of this hole 3, and the holes 2 and 2' for affixing the safety belt 9, an axis of symmetry can be drawn, which is shown in FIGS. 1 to 4 as a broken line.

FIG. 1 shows the fitting in the unloaded state. On both sides of the broken center line notches 8 are visible, which will assure that under tensile stress, e.g. in an accident, the break line of the plastic cap 7 propagates through the shortest way to the nearest point of the opening 2'. In addition, as is apparent in FIG. 1, openings 2, 2' are displaced with respect to each other. The opening 2 of the metal plate 1 is shown with broken line; this is larger or wider than the opening 2' of the plastic cap 7. In the normal position, the safety belt 9 is resting against the edge of the opening 2' in the plastic cap 7 and thus is supported by the plastic cap 7. If as a result of an accident or similar event a tensile stress is applied to the safety belt 9 in the upward direction in FIGS. 1 or 2, the safety belt 9 will pull so strongly on the plastic cap 7 that the weakened line from the notch 8 to the opening 2' breaks through.

The lower half 7' of the plastic cap turns around in the direction of the arrow 10 in FIG. 2 due to gravity, while the upper half is pulled up so far that the upper edge of the opening 2' coincides with the upper edge of the opening 2 in the metal plate. In this instance the metal plate takes over the function of supporting the safety belt 9 in the manner described above. An indicator symbol 5, e.g. a luminous color, is exposed, on which perhaps the inscription 6 "Crash" is also visible.

Figure 3:
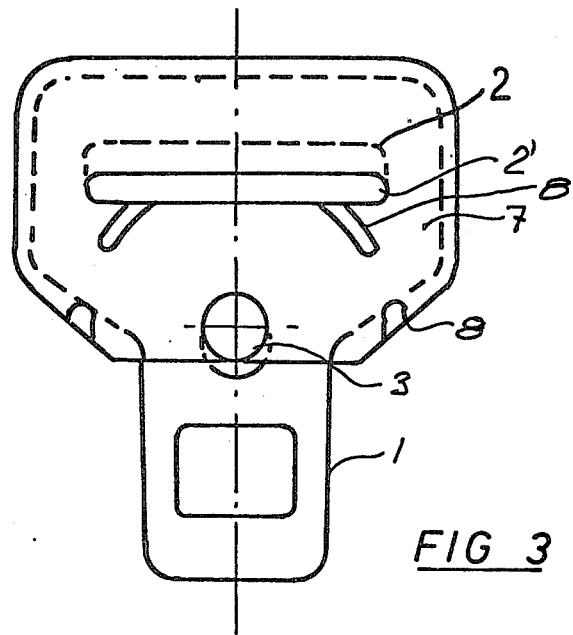
FIG. 3 is a top view of a safety belt buckle tongue with a plastic cap and notches without having undergone the critical load.
Figure 4:
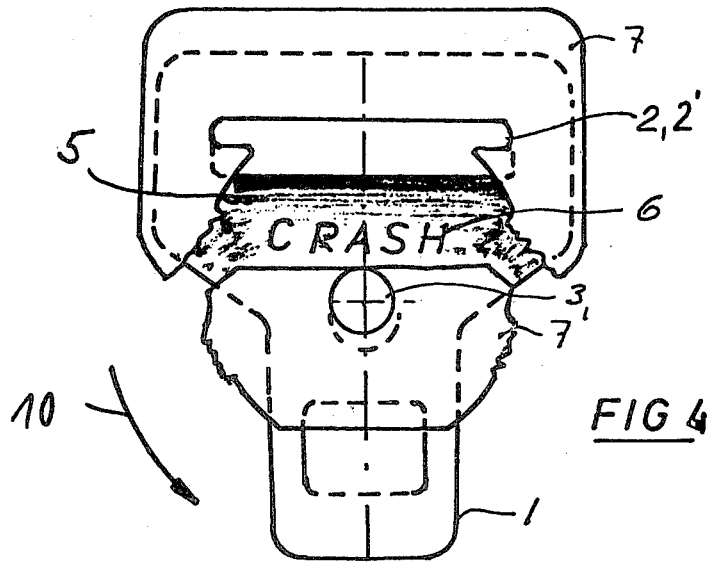
FIG. 4 is the same view of the buckle tongue as in FIG. 3, but after loading and exposure of the indicator.

The embodiment of the buckle tongue shown in FIGS. 3 and 4 is similar. Only the upper part of the buckle tongue above hole 3 is covered with the plastic cap 7. There is also provided a somewhat wider opening 2 in the dashed-line upper half of the metal plate 1, as compared to the smaller opening 2' in the plastic cap 7. In this embodiment notches 8 are provided, also on both sides of the broken center line, both from the outside edge inward and from the inner opening 2' outward. Thereby, the weakening of the plastic cap 7 is defined to a certain extent, and the direction of the break line is predetermined. The belt, which transmits normally its slight tensile stress to the upper edge of the opening 2' in the plastic cap 7, pulls the top part of the plastic cap upwards, after breaking along the break lines in the direction of the notches 8, until the upper edge of the opening 2' in the plastic cap 7 corresponds to the upper edge of the opening 2 in the metal plate 1.

The central lower part 7' of the plastic cap is thereby separated from the top part and it can therefore rotate, under the effect of gravity, in the direction of the arrow 10, as it is shown in FIG. 4. At this time the warning is revealed in the form of a prominent color, such as red or violet, and/or an inscription such as "Crash".

A fitting used in this manner, or such a restraining device, gives irreversible indication whether or not a tensile stress was applied in excess of the predetermined allowable load limit.

The supporting device of this invention may also have a colored coating. It should then have such a shape, that when it is loaded, it elongates or bends under the tensile stress. For example, instead of the plastic cap 7, a fragile and stiff black coating can surround the elastic indicator color. When the metal plate of the anchoring device stretches or bends, the coating fractures and falls off, thus revealing the indicator color.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. A seat belt restraint sysem indication device for indicating when said seat belt restraint system is subjected to a tensile loading above a predetermined amount, said indication device comprising at least two parts having different tensile strengths, said parts being displaceable with respect to each other upon loading of said indication device in tension above said amount, a first of said parts comprising a metal plate having an opening for communication with said seat belt, a second of said parts comprising a plastic cap which at least partially surrounds said metal plate, said metal plate having indicator means which becomes apparent upon displacement of said parts, said indicator means being of a different color than said cap and/or bearing an indicating legend, said plastic cap being displaced with respect to said metal plate upon said loading of said device and said plastic cap being provided with at least one weak point about which said cap breaks upon loading of said restraining device above said amount.

2. The indication device of claim 1 wherein said device comprises a buckle tongue.

3. A seat belt restraint system indication device for indicating when said seat belt restraint system is subjected to a tensile loading above a predetermined amount, said indication device comprising at least two parts having different tensile strengths, said parts being displaceable with respect to each other upon loading of said indication device in tension above said amount, a first of said parts having indicator means which becomes apparent upon displacement of said parts, said first part comprising a metal plate having an opening for communication with said seat belt, a second of said parts comprising a plastic cap which at least partially surrounds said first part, said plastic cap having an opening located in partial overlapping relationship with said opening in said metal plate.

4. The indication device of claim 3 wherein said opening in said plastic cap is smaller than said opening in said plate.

5. A seat belt restraint system indication device for indicating when said seat belt restraint system is subjected to a tensile loading above a predetermined amount, said indication device comprising at least two parts having different tensile strengths, said parts being displaceable with respect to each other upon loading of said indication device in tension above said amount, a first of said parts having indicator means which becomes apparent upon displacement of said parts, said first part comprising a metal plate having an opening for communication with said seat belt, a second of said parts comprising a plastic cap which at least partially surrounds said first part, and mounting holes in said metal plate and said plastic cap, said mounting holes adapted to receive a fastening means, said plastic cap being displaceable about said fastening means upon loading of said indication device above said amount.

6. A seat belt restraint system indication device for indicating when said seat belt restraint system is subjected to a tensile loading above a predetermined amount, said indication device comprising at least two parts having different tensile strengths, said parts being displaceable with respect to each other upon loading of said indication device in tension above said amount, a first of said parts having indicator means which becomes apparent upon displacement of said parts, said first part comprising a metal plate having an opening for communication with said seat belt, a second of said parts comprising a plastic cap which at least partially surrounds said first part, said plastic cap having an opening located in partial overlapping relationship with said opening in said metal plate and being provided with at least one weak point about which said cap breaks upon loading of said indication device above said amount, and mounting holes in said metal plate and said plastic cap, said weak point comprising an indentation or weakening restriction located between said opening in said cap and said mounting hole in said cap.

7. The indication device of any of claims 3, 5, or 6 wherein said indicator means is of a different color than said cap.

8. The indication device of any of claims 3, 5, or 6 wherein said indicator means is provided with an indicating legend.

9. The indication device of claim 8 wherein said indicator means is of a different color than said cap.

* * * * *